W. P. MORGAN.
APPARATUS FOR DUSTING POULTRY WITH INSECTICIDE.
APPLICATION FILED JULY 17, 1916.
1,219,842.
Patented Mar. 20, 1917.
2 SHEETS—SHEET 1.
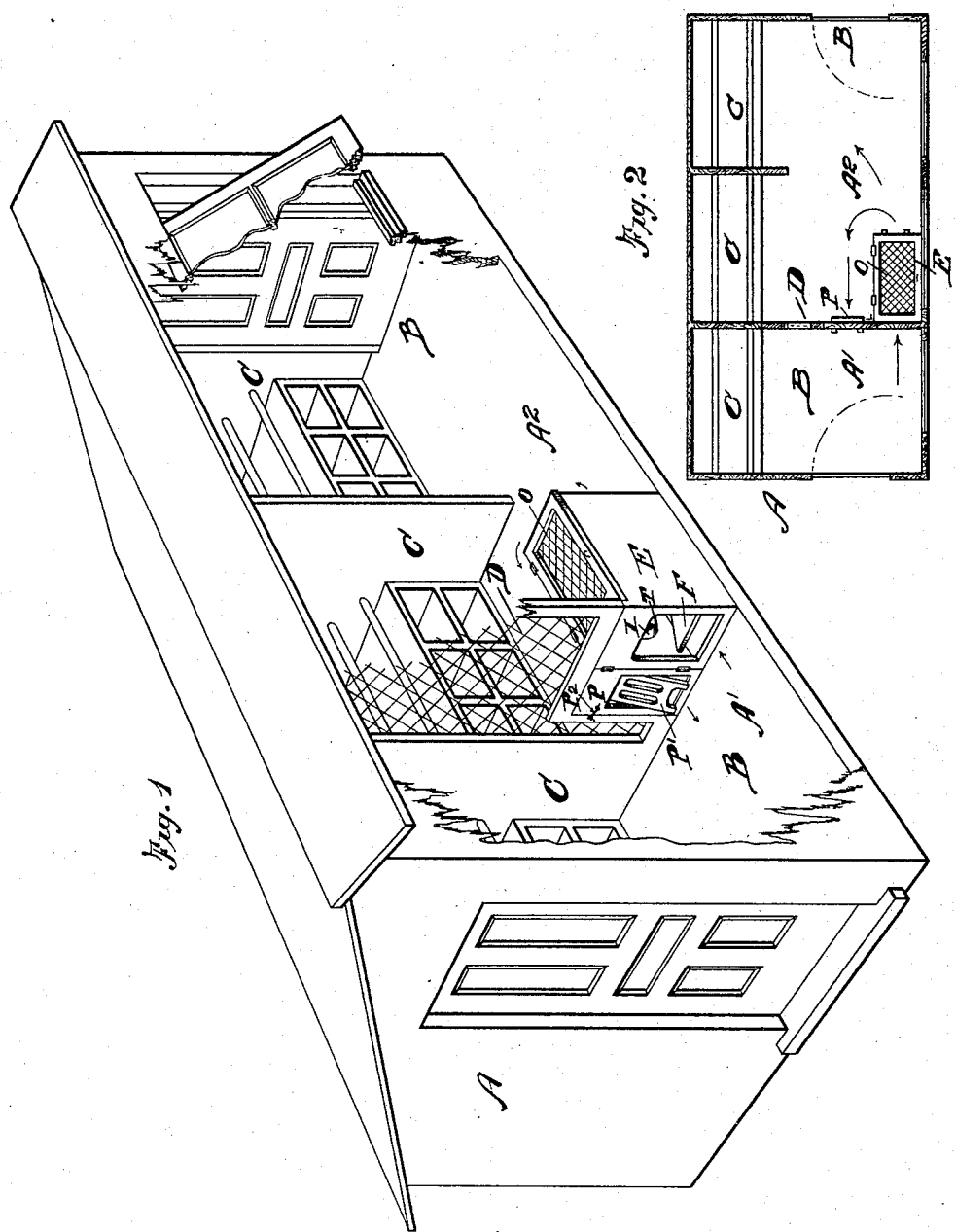
WITNESSES:
INVENTOR
William P. Morgan
BY
ATTORNEY

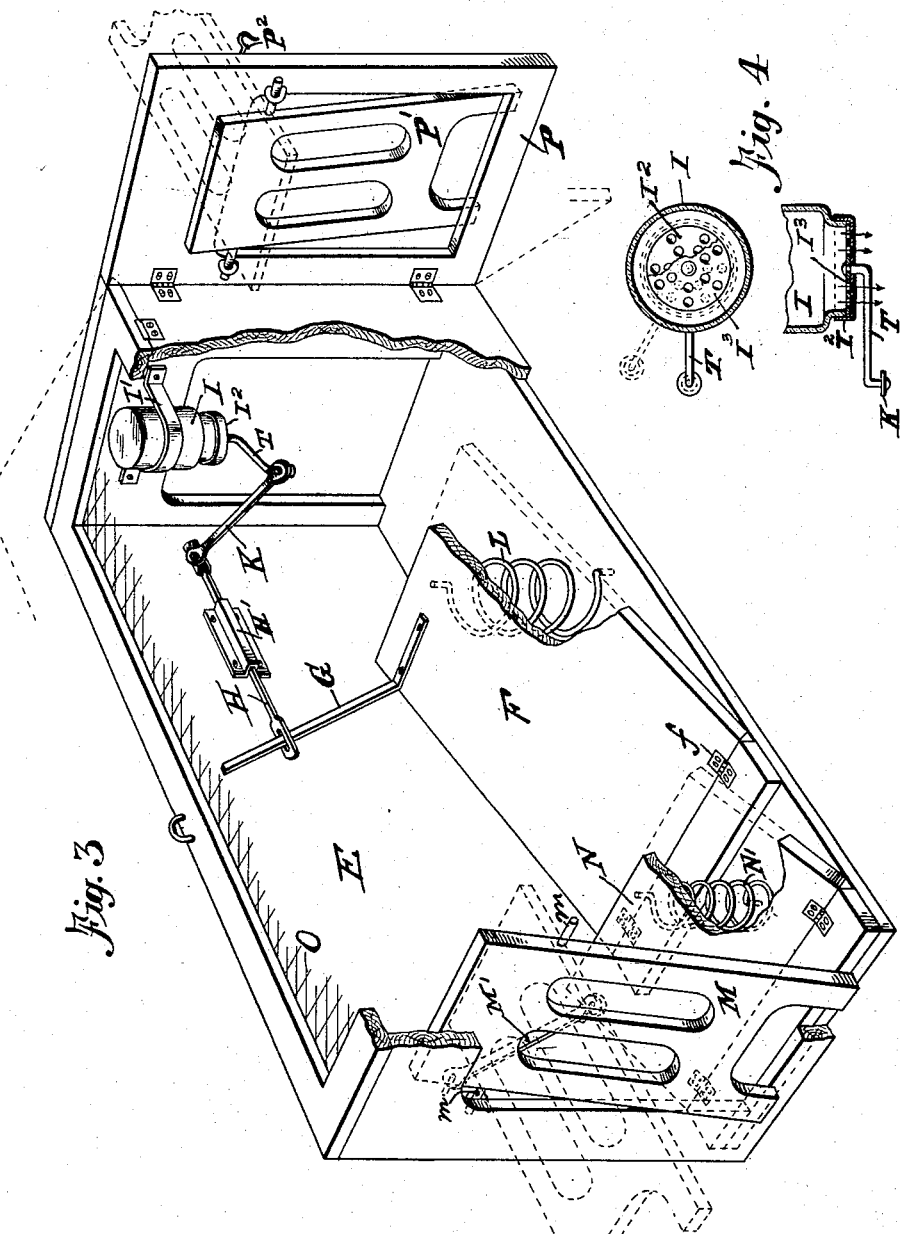

UNITED STATES PATENT OFFICE.

WILLIAM P. MORGAN, OF GROSSE ILE, MICHIGAN.

APPARATUS FOR DUSTING POULTRY WITH INSECTICIDE.

1,219,842.　　　　　Specification of Letters Patent.　　　Patented Mar. 20, 1917.

Application filed July 17, 1916. Serial No. 109,784.

*To all whom it may concern:*

Be it known that I, WILLIAM P. MORGAN, citizen of the United States, residing at Grosse Ile, county of Wayne, State of Michigan, have invented a certain new and useful Improvement in Apparatus for Dusting Poultry with Insecticide, and declare the following to be a full, clear, and exact description of the same, such as will enable others skilled in the art to which it pertains to make and use the same, reference being had to the accompanying drawings, which form a part of this specification.

My invention relates to an apparatus for dusting poultry with an insecticide, shown in the accompanying drawings and more particularly pointed out in the following specifications and claims:—

One of the objects of this invention is to provide a device simple in its construction and operation adapted to be actuated by the poultry upon passing through the apparatus, the device being so located in the poultry house or run-way as to insure its operation in the manner hereinafter described.

Another feature of the invention is the means employed to provide for a thorough application of the insecticide upon and between the feathers of the fowl as it passes through the apparatus, by automatically operated mechanism actuated by the fowl itself in transit.

Another feature of the invention consists in providing means whereby the fowl is only permitted to pass in one direction through the compartment housing the "dusting" controlling mechanism; the arrangement being such however that the fowl may return through another passage so as to pass through the dusting compartment as before; the purpose of this arrangement being to provide against crowding or confusion in going from one portion of the house or run-way to the other and to insure the proper operation of the apparatus in dusting the fowl.

Other advantages and improvements will hereafter appear.

In the drawings accompanying this specification,

Figure 1 is a perspective view of a chicken house with a portion of its wall broken away to disclose the interior, showing the device installed therein.

Fig. 2 is a plan view of the same with parts in section.

Fig. 3 is a perspective view of the apparatus with parts broken away and in section, to disclose the operating mechanism.

Fig. 4 are sectional views through the container for the insecticide, showing the means controlling its discharge therefrom.

Referring now to the letters of reference placed upon the drawings.

A, denotes a poultry house of usual construction having a passage way B, connecting with the respective roosting and nesting compartments C located within.

D, indicates a screen or other partition wall (which may be removable if desired) dividing the passage way B, into two compartments.

E, denotes a removable cabinet located in an opening provided for its reception in the partition wall D. F, is a swinging platform hinged at $f$, to the base of the cabinet. G, is an upstanding arm rigidly secured to the swinging platform. H, is a sliding bar,—slotted to receive the arm G,—supported in a sleeve H', secured to the wall of the cabinet. I, is an inverted container (preferably of the Mason canning jar type) for insecticide secured to the end wall of the cabinet above its inlet opening, by a band I', projecting from the wall.

$I^2$, is a perforated cap screwed upon the neck of the container. $I^3$, is a revoluble perforated disk located within the cap $I^2$, the respective perforations of the cap and disk being adapted to register upon rotation of the disk that the insecticide may be discharged. T, denotes a rocker arm journaled in the cap and to which the disk $I^3$, is secured. K, is a link connection between the rocker arm T, and the sliding bar H. L, denotes a spring located beneath the swinging platform F, to return the latter to its normal position following compression. M, indicates a swinging door pivoted at $m$, to the wall of the cabinet, M' is a link connection between the swinging door and the hinged platform N, whereby the door is opened. N', indicates a spring located beneath the platform to return the latter to its normal position. O, indicates a screened door or cover for the cabinet.

P, denotes a frame hinged to the side wall of the cabinet in which is mounted a swinging gate P', adapted to close by gravity, the construction of the latter being such that it can only be opened in one direction. P² is a hook to secure the hinged frame P in its open and closed position.

Having indicated the several parts by reference letters the construction and operation of the device will be readily understood. The device may be installed in any convenient location through which the fowls are required to pass to gain access to the poultry house or to leave the latter, or it may be located so that the fowls must pass through it to reach their nesting or roosting places. In the drawings the usual passageway in a poultry house is shown divided by a screened partition wall, having an opening to receive the cabinet. In putting the device into operation the chickens are first driven into compartment A', of the coop for example;—feed is then thrown into compartment A², to induce the fowl to pass through the open end of cabinet, over the tilting platforms F and N, into the compartment A², from which compartment they are free to return into compartment A', through the swinging gate P'. The gate P', and the swinging door M, at the end of the cabinet being adapted to open in one direction only, the fowl are required to travel along the route indicated by the arrows when passing from one compartment to the other;—thus confusion is avoided and the proper operation of the device insured. Upon the fowl stepping upon the hinged platform F, the latter is depressed, which action causes the rigid arm G, to actuate the sliding bar H. The latter being connected by the link K, with the rocker arm T,—upon which the perforated disk I³, is mounted—actuates the disk causing its perforations to register with those in the cap I², thereby releasing the powder in the container I, as the fowl pass through the cabinet. Upon a chicken stepping upon the platform N, the swinging door M, is raised through the operation of the link connection M', permitting the fowl to pass out into compartment A², from whence it may return to compartment A' through the automatically closing one-way swinging gate P'. It will be noted that the springs located beneath the respective hinged platforms F and N serve to return them to their initial position ready for another operation.

The frame P, supporting the swinging gate may be linked against the wall of the cabinet when shipping the device, and in an open position when regularly installed for operation.

Having thus described my invention what I claim is:—

1. In a device of the character described, a frame having an open end for the admission of a fowl, a container for insecticide located within the frame, means for releasing insecticide from the container upon the fowl, actuated by the fowl itself, a hinged door adapted to be raised by the fowl to release the latter and to automatically close against the return of the fowl through the device from the direction of said door, a frame hinged to the outside of the device adapted to close against the wall of the latter for shipment, and an automatically closing door hinged in said frame adapted to be opened by the fowl, whereby the latter may again enter the open end of the device to actuate the insecticide releasing mechanism.

2. In a device of the character described, a frame, an insecticide container in said frame, a closure for said container, a platform hinged at one end to said frame, a rocker arm connected to said closure, a bar slidably mounted on the frame, a link connecting the sliding bar and the rocker arm, and an upstanding arm secured to the free end of the platform and engaging said sliding bar, whereby the aforesaid container closure will be operated upon the depression of the platform.

3. In a device of the character described, a frame having an open end for the entry of fowl, a container for insecticide located above the open end of the device, means for releasing insecticide from the container, a platform hinged at one end to the frame and adapted to be depressed by the fowl in its passage through the device, means operated by the depression of the platform for releasing insecticide from the container, a hinged door closing the opposite end of the device, a second depressible platform hinged adjacent the door within the frame and extending therein, and a link connecting the second platform with the door, whereby the latter may be opened under the weight of the fowl standing upon said second platform, said door being adapted to close against the return of the fowl through the latter end.

In testimony whereof, I sign this specification in the presence of two witnesses.

WILLIAM P. MORGAN.

Witnesses:
S. E. THOMAS,
M. E. THOMAS.